(12) United States Patent
Nemish (10) Patent No.: US 7,159,633 B2
(45) Date of Patent: Jan. 9, 2007

(54) WHEEL CLAMPING ASSEMBLY

(76) Inventor: Stephen C. Nemish, 312 Wynstay Ave., Valley Park, MO (US) 63141

( * ) Notice: Subject to any disclaimer, the term of this patent is extended or adjusted under 35 U.S.C. 154(b) by 51 days.

(21) Appl. No.: 11/119,201

(22) Filed: Apr. 29, 2005

(65) Prior Publication Data

US 2006/0243394 A1    Nov. 2, 2006

(51) Int. Cl.
*B60C 25/00* (2006.01)
*B60C 30/00* (2006.01)
*B60C 25/05* (2006.01)
*B60C 30/06* (2006.01)

(52) U.S. Cl. ............................ 157/18; 157/11; 157/14; 157/16; 157/21; 157/1.17; 157/1.24; 269/305; 269/236

(58) Field of Classification Search ................ 157/18, 157/14, 16, 20, 21, 17, 11, 1.17, 1.24, 1.36, 157/1.39, 1.41, 1.1; 269/305, 236
See application file for complete search history.

(56) References Cited

U.S. PATENT DOCUMENTS 2,873,777 A * 2/1959 Thostenson ................ 157/16
3,339,611 A * 9/1967 Scott ......................... 157/1.24
3,789,894 A * 2/1974 Adams ....................... 157/17
3,891,019 A * 6/1975 Holladay ................... 157/1.24

OTHER PUBLICATIONS

Coats Model 220 Motorcycle Tire Changer, http://www.wikco.com/coats220.html.*
MC110.100 Motorcycle tire Changer, http://www.wikco.com/mc110.html.*
TSI Multi-Tire Changer, http://www2.northerntool.com/products/47898_47898.htm.*

* cited by examiner

*Primary Examiner*—Joseph J. Hall, III
*Assistant Examiner*—Bryan R. Muller (57) ABSTRACT

A wheel clamping assembly provides a frame having three arms, two fixed stops and a turnable cam. The arms are equally spaced and have holes to admit the stops and the cam. The stops have an extension eccentrically located upon the top of the cylinder. Then the cam has an involute, having an expanding radius, upon the top of the cam. In use, the stops are placed upon two arms and the cam is placed upon the remaining arm, all at the same radius. A wheel rim is positioned upon the stops and the cam. The cam is then turned to grasp the wheel. The stops and the cam are made of a non-marring material.

9 Claims, 6 Drawing Sheets

WHEEL CLAMPING ASSEMBLY

BACKGROUND OF THE INVENTION

The wheel clamping assembly relates generally to tire changing machinery and more specifically to a frame to clamp a wheel.

In bays and shops across the land, tires are changed from wheels in large numbers everyday. Tires have sidewalls upon both sides of the tire that extend partially towards the center. At the innermost portion of the sidewall, the tire has an encased bead. The bead is a thickened portion of the sidewall surrounding metal wire. Now a wheel generally has two parallel rims upon the circumference of both sides of the wheel. The rims have a greater diameter than the substantial portion of the circumference.

Tire changing involves mounting a tire upon a wheel or removing a tire from a wheel. For mounting a tire upon a wheel, the wheel is clamped into a fixed position. One bead is placed over a rim as much as possible and then mechanical means stretch the remainder of the bead over the rim. The second bead undergoes the same procedure. Inflating the tire then seats both beads against their respective rims. For removing a tire from a wheel, the wheel is clamped again into a fixed position. The tire is partially deflated and then mechanical means is inserted between a bead and a rim. The mechanical means stretches a small portion of the bead over the rim. Continuing to operate, the mechanical means then lifts the remainder of the bead over the rim. As before, the second bead undergoes the same demounting procedure.

Wheels are used on many vehicles. On utility vehicles, the appearance of wheels matters less so than on personal vehicles. For automobiles, motorcycles, and some boat trailers, the wheels and their appearance have high importance to their drivers. People often place great emphasis on the appearance of wheels as part of their self image. The after market in wheels of all kinds has enormous size. Often, people seek out shiny or novelty wheels to separate vehicles. In particular, motorcycles have shiny wheels including spokes and rims.

DESCRIPTION OF THE PRIOR ART

Traditionally, wheels, even shiny wheels, have been clamped for tire changing and other procedures. In a typical prior art frame, a wheel is placed upon a three armed frame and a shaft descends to and often through the hub of the wheel. Then one or more heavy steel jaws advance and grasp the rim of a wheel. The heavy jaws often mar the rim of a wheel.

In particular, an existing motorcycle tire changer has a three armed frame with steel jaws to grasp a wheel. The three arms have an equiangular arrangement and a jaw pivotally mounts upon each arm. Each jaw has two upright sides with an edge to grasp the rim. The two sides allow each jaw to grasp a round rim tightly. Generally, the jaws have a U shaped cross section of varying height. The jaws upon two arms are positioned at fixed intervals along the arms. The jaw upon the third arm can be adjustably positioned using a hand crank. The hand crank turns a threaded shaft connected to the jaw. The jaw on the third arm then locks the wheel upon the frame.

The prior art has many frames and devices to clamp wheels. However, the prior art shares the common disadvantage of marring the rim of a wheel. The jaws of the existing tire changer contact a wheel at six points and depending on wheel hardness will mar the wheel at each point. Marring leads to discoloration, rust, and an unsightly appearance. For drivers and cyclists sensitive to the appearance of their wheels, marring is not acceptable.

The present invention overcomes the difficulties of marring a wheel during clamping.

SUMMARY OF THE INVENTION

Generally, the present invention provides a frame having three arms, two fixed stops upon two arms, and a turnable cam. The arms have an equi-angular orientation and a pattern of holes to admit the stops and the cam. The stops have a pin, a cylinder centered upon the pin, and an extension eccentrically located upon the top of the cylinder. Then the cam has a pin, a cylinder centered upon the pin, and an involute upon the top of the cam. In use, the stops are placed upon two arms at the same radius from the center of the frame and the cam is placed upon the remaining arm at the same radius. A wheel rim is placed upon the stops and the cam. The cam is then turned to grasp the wheel. The stops and the cam are made of a non-marring material.

There has thus been outlined, rather broadly, the more important features of the invention in order that the detailed description thereof that follows may be better understood and that the present contribution to the art may be better appreciated. The present invention also includes ears upon the bottom of the stops, extensions having four curved edges, and a handle upon the cam. The extensions and the involute also have inward beveled edges to grasp the rim of a wheel. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a new and improved wheel clamping assembly.

Another object is to provide such a wheel clamping assembly that has clamps that engage a wheel firmly but without marring the wheel.

Another object is to provide such a wheel clamping assembly that is portable.

Another object is to provide such a wheel clamping assembly that has edges upon the stops and cam to lower the risk of injury to people.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

The same reference numerals refer to the same parts throughout the various figures.

DESCRIPTION OF THE PREFERRED EMBODIMENT

The present art overcomes the prior art limitations by providing stops and a cam upon a frame that grasp a wheel without marring. Beginning on FIG. 1, a wheel 3 clamping assembly 1 has three arms 5 generally in a Y shape and more specifically arranged equi-angular. Each arm 5 has a top surface 5a and a pattern of holes along the top surface 5a of the arms 5. Upon two of the arms 5, a stop 6 is placed. Each stop 6 has notches 13 upon the bottom surface 6b so the stop 6 rests upon the top surface 5a of an arm 5 and resists rotation. In the preferred embodiment, the stop 6 has four notches 13 symmetrically arranged upon the bottom surface 6b. The notches 13 have a width that snugly fits the arms 5. Upon the top surface 6a of each stop 6, each stop 6 has an extension 6c. The extension 6c has an inward bevel 11 where the uppermost portion of the extension 6c is wider than the lowest portion of the extension 6c in contact with the top surface 6a of the stop 6. The inward bevel 11 allows the extension 6c of the stop 6 to grasp the rim 2 of a wheel 3.

Figure 1:
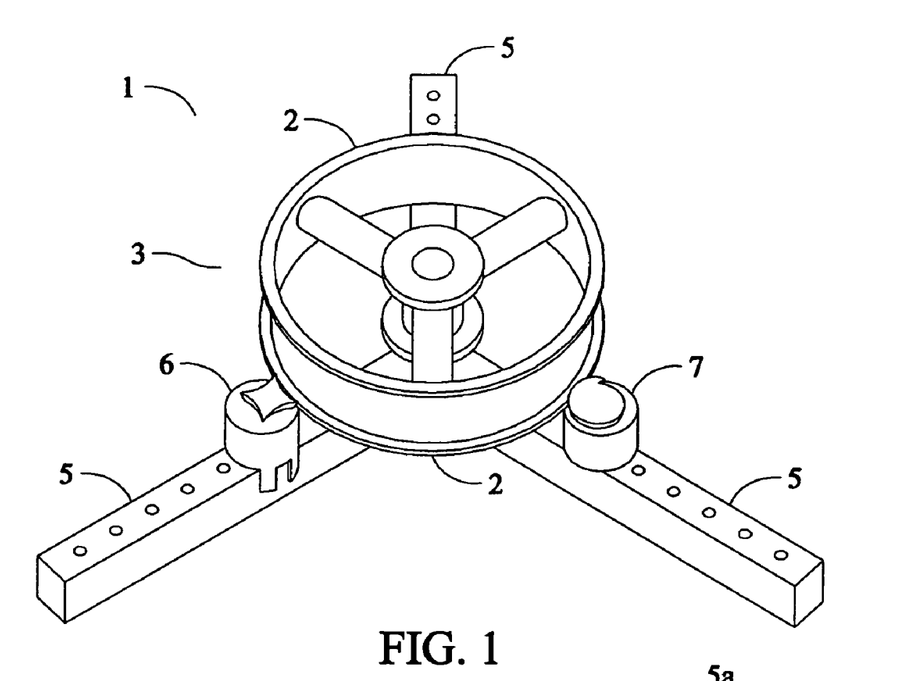
FIG. 1 shows an oblique view of a wheel located upon the frame, stops, and cams constructed in accordance with the principles of the present invention.

Upon the third arm 5, a cam 7 is placed. The cam 7 has a generally flat bottom surface 7b that rests upon the top surface 5a of the third arm 5. Opposite the bottom surface 7b, the cam 7 has an involute 7c. As in the stops 6, the involute 7c has an inward bevel 11 to grasp the rim 2 of a wheel 3. The involute 7c begins with a first radius 15a approximately ½ inch from the edge of the cam 7. The involute 7c then has the radius lengthen around the perimeter of the involute 7c at a regular rate. The second radius 15b extends to approximately ¼ inch from the edge of the cam 7 proximate to the first radius 15a. The cam 7 has a handle 14 extending perpendicular to the cam 7 at generally half the height of the cam 7. The handle 14 is approximately one eighth turn behind the second radius 15b.

FIG. 1 shows a wheel 3 placed upon the present invention 1. The stops 6 are positioned with the extension 6c turned closest to the rim 2 of the wheel 3. The stops 6 occupy a hole to accommodate the radius of the wheel 3. The cam 7 is positioned upon the third arm 5 within reach of an operator. The involute 7c grasps the rim 2 of the wheel 3. As the operator turns the handle 14 towards the wheel 3, the involute 7c grasps the rim 2 tighter. When the involute 7c binds upon the wheel 3, the rim 2 is secure for tire changing using conventional methods, not shown. In the preferred embodiment, the stops 6 and the cam 7 are made of a polymer material that has lesser hardness than the rim 2 and thus does not mar metal rims 2 of wheels 3.

Figure 2:
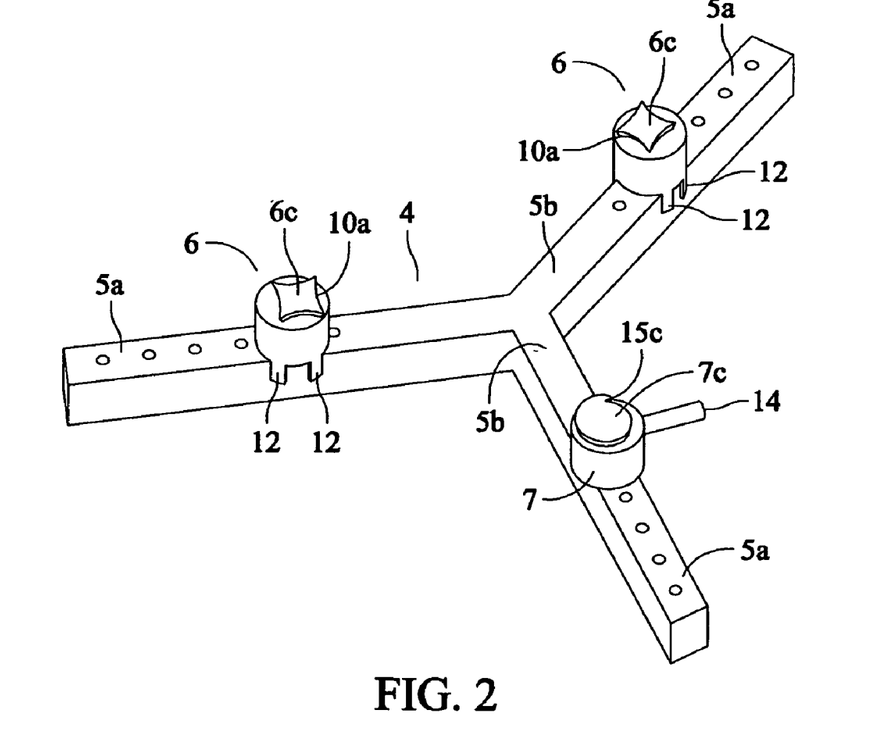
FIG. 2 shows an isometric view of the present invention.

FIG. 2 shows the present invention 1 without an installed wheel 3. The present invention 1 has three arms 5 generally in a Y shape and equi-angular. The arms 5 are slender where the length markedly exceeds the width of an arm 5. Each arm 5 has a top surface 5a and a pattern of holes along the top surface 5a. The holes indicate common diameters of wheels 3 likely to be used upon the present invention 1. Upon two of the arms 5, a stop 6 is placed. Each stop 6 has notches 13 upon the bottom surface 6b so the stop 6 resists rotation. Preferably, the stop 6 has four notches 13 symmetrically arranged. Opposite the notches 13, each stop 6 has an extension 6c with an inward bevel 11 to grasp the rim 2 of a wheel 3. Upon the third arm 5, a cam 7 is placed upon the top surface 5a. The cam 7 has an involute 7c, also with an inward bevel 11 to grasp the rim 2 of a wheel 3. The involute 7c begins with a first radius 15a, expands the radius around the perimeter of the involute 7c, and ends at a second radius 15b near to the position of the first radius 15a. The handle 14 identifies the cam 7 and allows an operator to turn the cam 7 and secure a wheel 3 within the cam 7 and the stops 6 for tire changing.

Figure 3A:
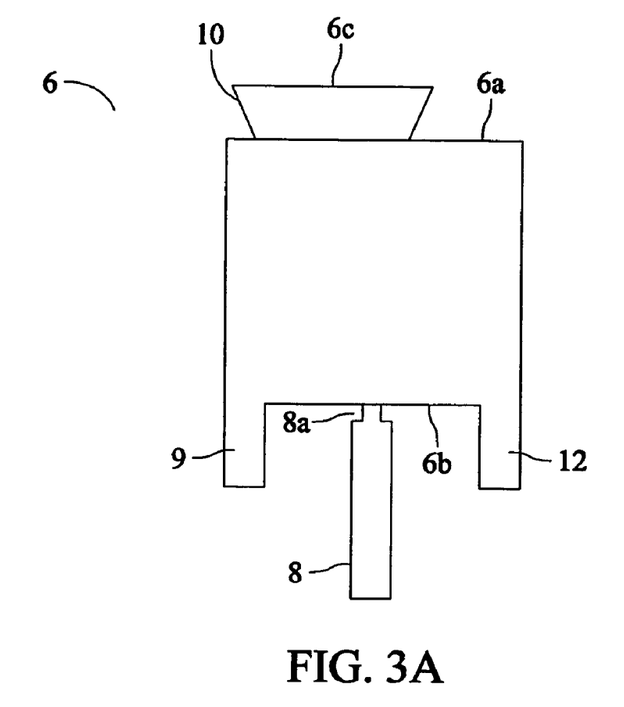
FIG. 3a shows a side view of a stop of the present invention.

More particularly, FIG. 3A shows a side view of a stop 6. The stop 6 has a generally round cylindrical shape with a top surface 6a and an opposite bottom surface 6b joined by a perimeter side. Upon the top surface 6a, each stop 6 has an extension 6c. The extension 6c is located off center and has three or more edges. In the preferred embodiment, the extension 6c has four edges 10 with a first edge 10a as a chord located approximately ¼ inch from the perimeter of the stop 6 here shown towards the left of the figure. As described previously, each edge has an inward bevel 11 where the uppermost surface of the extension 6c overhangs the joint of the extension 6c to the top surface 6a of the stop 6. The inward bevel 11 grasps the rounded surface of the rim 2 of a wheel 3.

Figure 5:
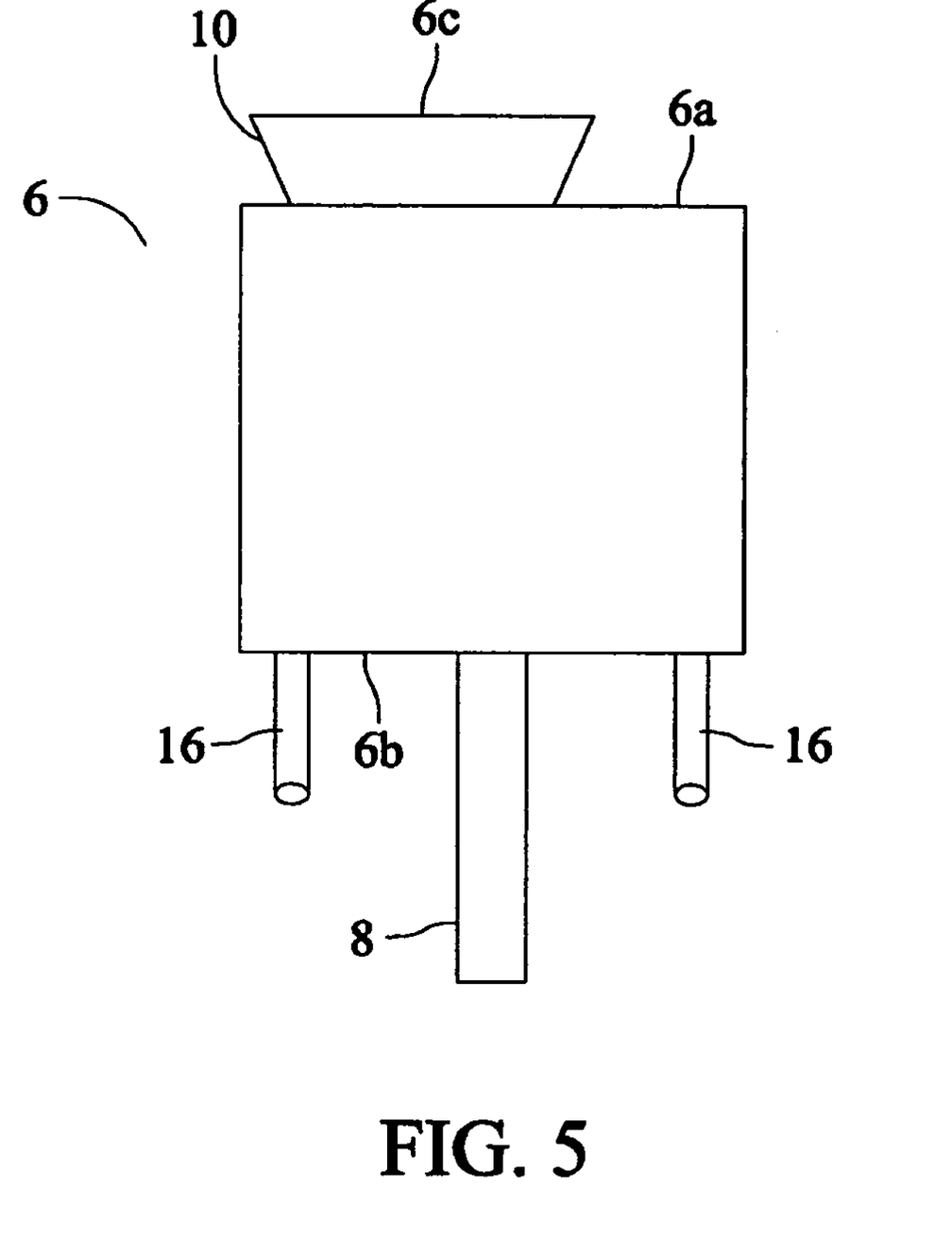
FIG. 5 describes an alternate embodiment of the fixing means.

Opposite the extension 6c and the top surface 6a, the stop 6, on its bottom surface 6b, has a means to fix 9 the stop 6 from rotation upon an arm 5. In the preferred embodiment, the bottom surface 6b has four ears 12 integral with the stop 6 and descending from the bottom surface 6b defining four notches 13. The four ears 12 define the fixing means 9. The notches 13 generally have the width of an arm 5 for a snug fit with minimal rotation of the stop 6 under load. Generally centered upon and depending from the bottom surface 6b, a pin 8 connects the stop 6 to an arm 5. In the preferred embodiment, the pin 8 is a solid steel cylinder that extends beneath the ears 12. The pin 8 has the same diameter as the holes in the arm 5 for a snug fit at a chosen diameter upon the frame 4. At the bottom surface 6b, the pin 8 has a circumferential groove 8a of slightly less diameter than the pin 8. The groove 8a grips the top surface 5a of the arm 5 snugly. Alternatively as later shown in FIG. 5, the fixing means is four pegs 16 inserted into the bottom surface 6b. The pegs 16 are generally cylindrical in shape and positioned to prevent rotation of the stop 6.

Figure 3B:
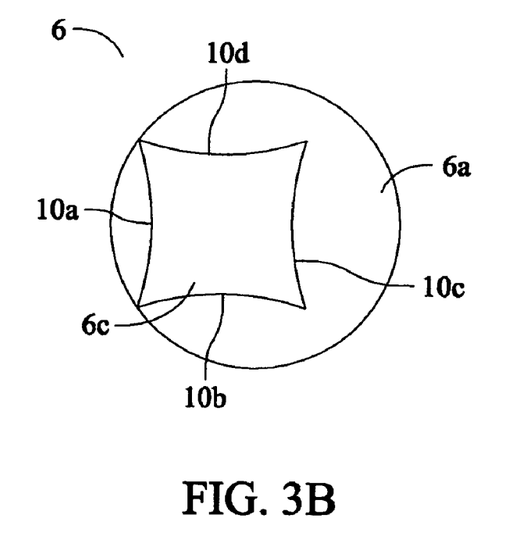
FIG. 3b shows a top view of a stop of the present invention.

FIG. 3B shows the top of a stop 6 and more particularly the extension 6c. The extension 6c is generally rectangular in shape and allows for four adjustments in grasping a wheel 3 when the stop 6 is at a chosen diameter indicated upon an arm 5. As described before, the preferred embodiment of the extension 6c has four edges 10 with the first edge 10a being a chord approximately ¼ inch from the perimeter of the top surface 5a. The first edge 10a of the extension 6c is nearest of all the edges towards the perimeter. Then the second edge 10b is a chord perpendicular to the first edge 10a and located approximately ½ inch from the circumference of the cam 7. The third edge 10c is also a chord parallel to the first edge 10a but located approximately one inch from the perimeter of the top surface 6a. And the fourth edge 11 is also a chord parallel to the second edge 10b but located approximately 1.25 inches from the perimeter.

Figure 3C:
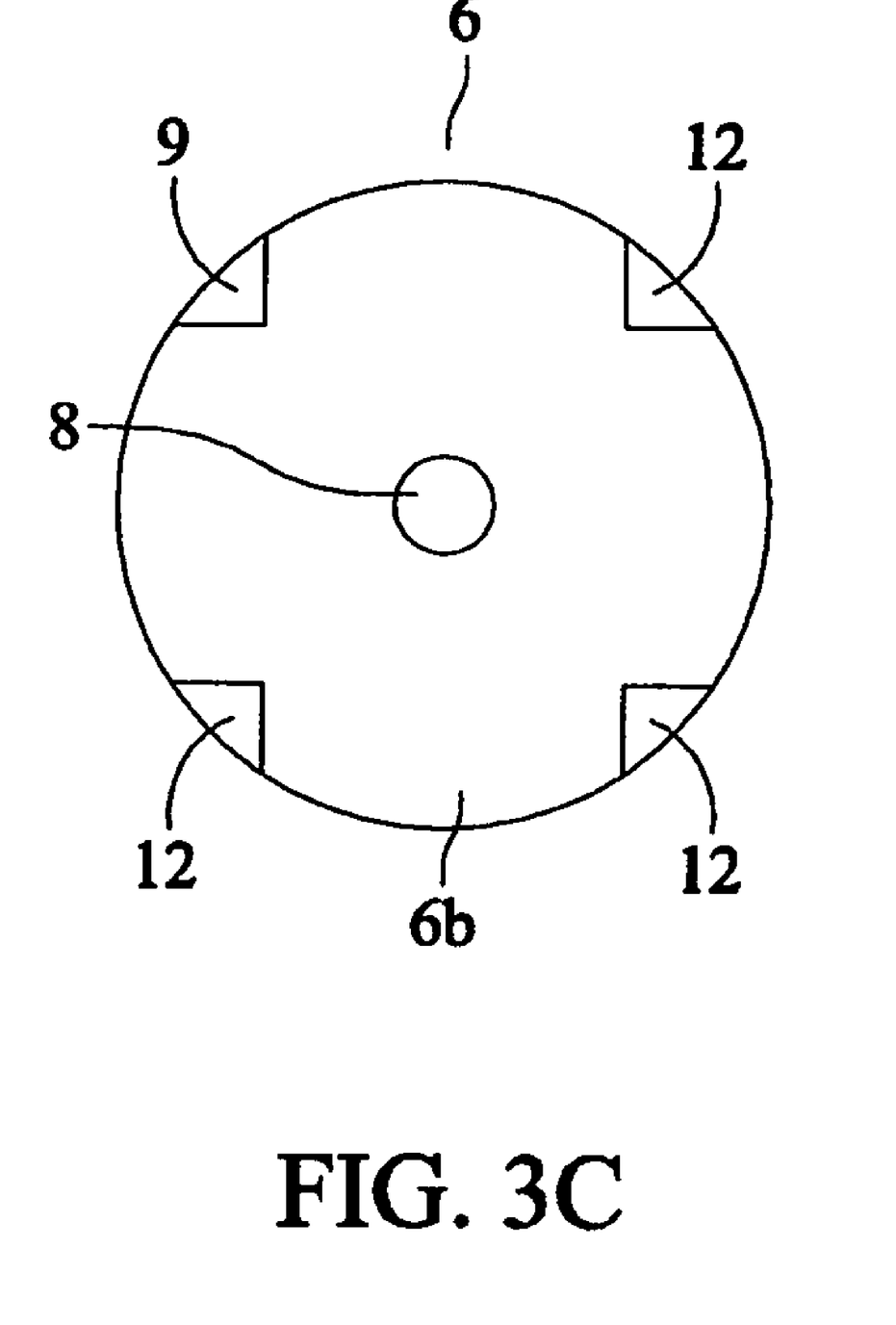
FIG. 3c shows a bottom view of a stop of the present invention.

On the other surface, FIG. 3C shows the bottom surface 6b of a stop 6. In the preferred embodiment, the bottom surface 6b has four ears 12 descending from the bottom surface 6b defining four notches 13. The four ears 12 and their respective notches 13 are symmetrically arranged along two axes of symmetry. The ears 12 have a rounded triangular shape with the hypotenuse of each ear 12 partially along the perimeter of the stop 6. The notches 13 generally have the width of an arm 5 for a snug fit. Generally centered upon the bottom surface 6b, the pin 8 extends outward from the stop 6 beyond and beneath the ears 12, and connects to an arm 5. And, the pin 8 has the same diameter as the holes in the arm 5 for a snug fit. Further, the pin 8 has a groove 8a around the circumference proximate to the stop 6 for grasping temporarily the top surface 5a of an arm 5 as previously shown in FIG. 3A.

Figure 4A:
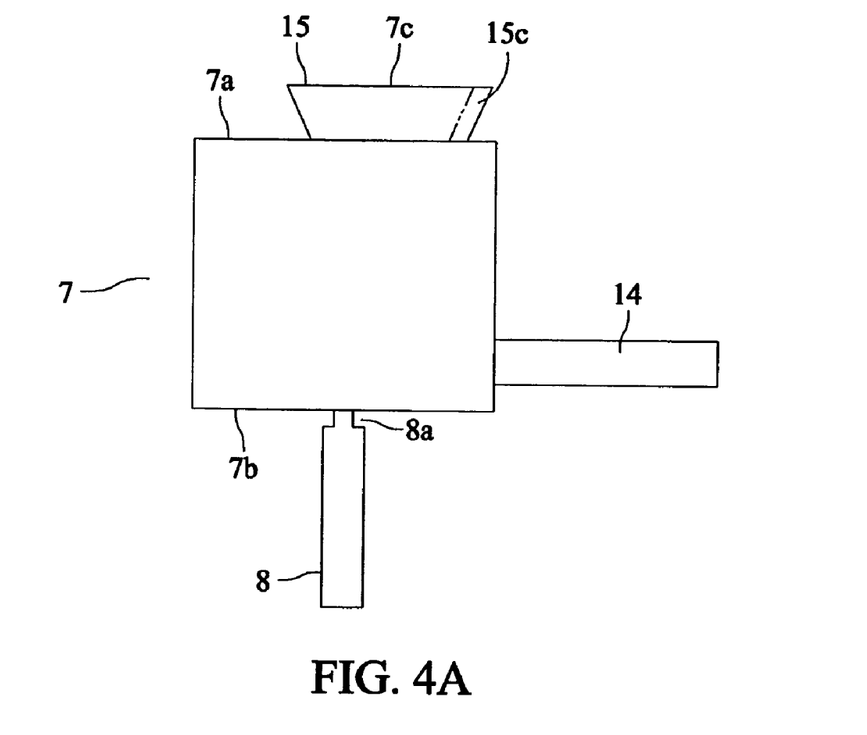
FIG. 4a shows a side view of the cam of the present invention.

Looking at the third securement for a wheel 3, FIG. 4A shows a side view of the cam 7. The cam 7 has a generally round cylindrical shape with a top surface 7a and an opposite bottom surface 7b joined by a perimeter side. Upon the top surface 7a, each cam 7 has an involute 7c. The involute 7c is located off center and has an initial radius ending approximately ½ inch from the perimeter of the cam 7. The radius then expands clockwise around the involute 7c. Generally near 12 the initial or first radius 15a, the involute 7c has a final or second radius 15b ending approximately ¼ inch from the perimeter of the cam 7. As described previously, the edge of the involute 7c has an inward bevel 11 where the uppermost surface of the involute 7c overhangs the joint of the involute 7c to the top surface 7a of the cam 7. The inward bevel 11 secures the rounded surface of the rim 2 of a wheel 3.

Opposite the involute 7c and the top surface 7a, the cam 7 has a flat bottom surface 7b that rests upon an arm 5 and allows the cam 7 to turn upon the arm 5. Generally centered upon and depend 5bing from the bottom surface 7b, a pin 8 connects the cam 7 to an arm 5. In the preferred embodiment, the pin 8 is a solid steel cylinder that extends beneath the ears 12. The pin 8 has the same diameter as the holes in the arm 5 for a snug fit at a chosen diameter upon the frame 4. At the bottom surface 7b, the pin 8 has a circumferential groove 8a of slightly less diameter than the pin 8. The groove 8a seats the cam 7 in the holes and upon the top surface 5a of the arm 5 snugly.

Extending from the perimeter side of the cam 7, a handle 14 permits an operator to turn the cam 7. The handle 14 is perpendicular to the cam 7 generally centered upon the height of the cam 7. Turning the cam 7 brings the involute 7c closer towards the rim 2 of a wheel 3, thus securing the wheel 3 to the frame 4.

Figure 4B:
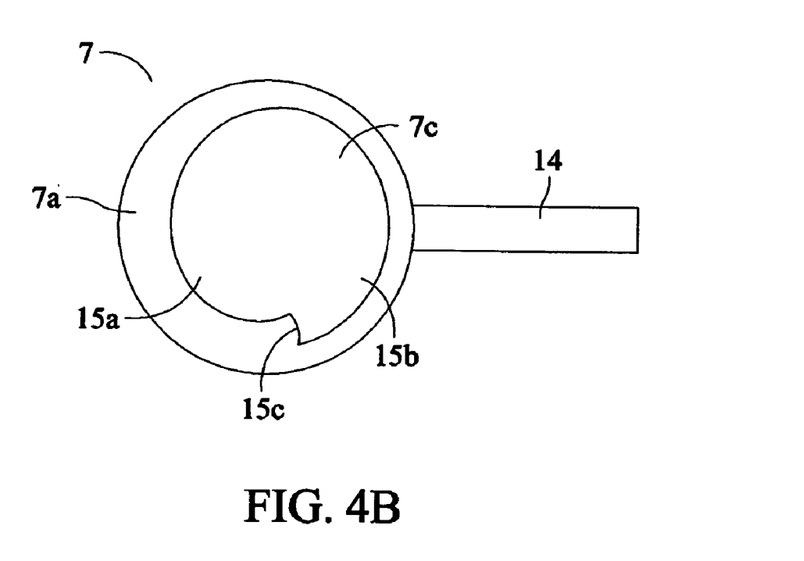
FIG. 4b shows a top view of the cam of the present invention.

FIG. 4B shows the top of the cam 7 and more particularly the involute 7c. The involute 7c is somewhat round in shape, more particularly nautilus like and similar to an arc formed as a line is extended under constant tension, and allows for adjusting the distance between the involute 7c and a rim 2 between two limits. As described before, the preferred embodiment of the involute 7c has an initial radius 15a and a final radius 15b with the final radius 15a exceeding the initial radius 15b by approximately ¼ inch. The final radius 15a locates the involute 7c closest to the perimeter of the cam 7. Viewing the top, the handle 14 extends from the cam 7, generally one eighth turn behind the final radius.

Figure 4C:
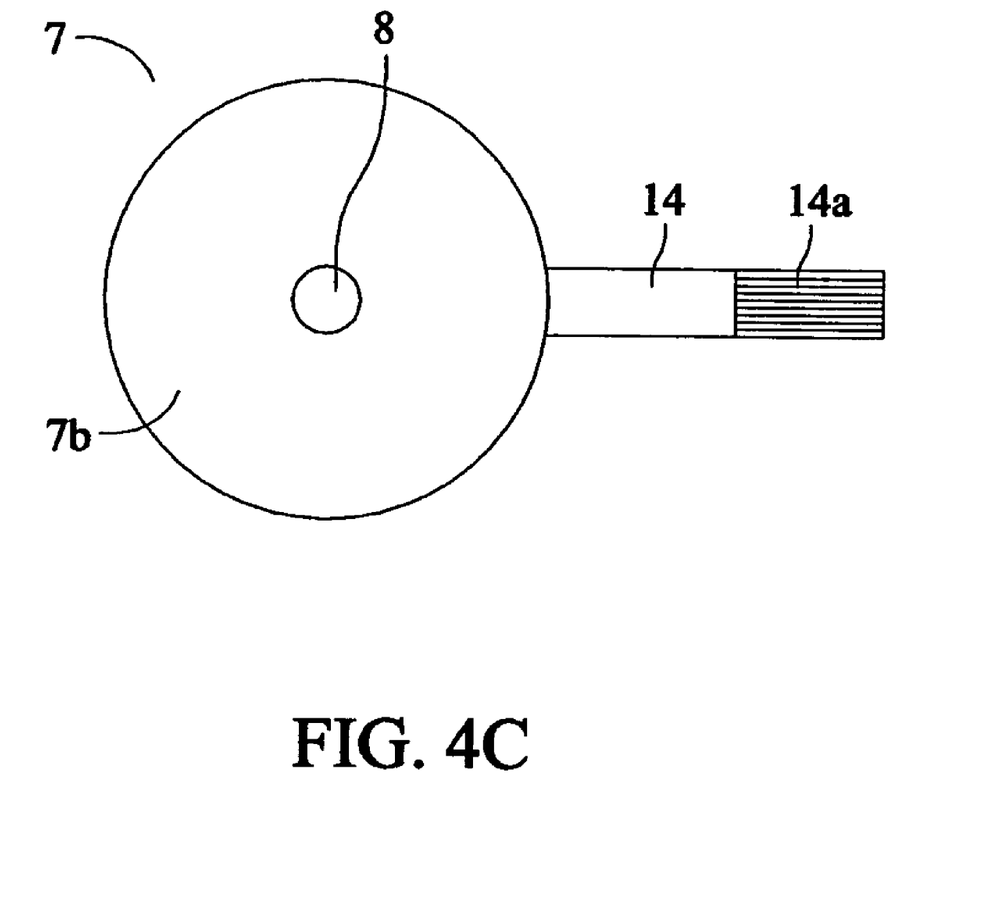
FIG. 4c shows a bottom view of the cam of the present invention.

Opposite the top of the cam 7, FIG. 4C shows the bottom surface 7b. In the preferred embodiment, the bottom surface 7b is flat. Then generally centered upon the bottom surface 7b, a pin 8 extends outward from the cam 7 beyond and perpendicular to the bottom surface 7b. As in the stop 6, the pin 8 in the cam 7 has the same diameter as the holes in the arm 5 for a snug fit. Further, the pin 8 has a groove 8a around the circumference proximate to the cam 7 for grasping temporarily the top surface 5a of an arm 5 as previously shown in FIG. 4A. Alternatively, the handle 14 has a grip 14a applied to assist an operator in turning the cam 7.

From the aforementioned description, a wheel clamping assembly has been described. The wheel clamping assembly is uniquely capable of clamping wheels without marring them. The wheel clamping assembly and its various components may be manufactured from many materials, including but not limited to, polymers, polyvinyl chloride, high density polyethylene, polypropylene, nylon, ferrous and non-ferrous metals, their alloys, and composites.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. An assembly for holding the rims of wheels, comprising:
    a frame having three or more joined coplanar arms;
    two or more stops having lesser hardness than said rim, said stops connecting to said arms;
    one or more cams having lesser hardness than said rim, said cams connecting to said arms;
    said stops and said cams being of a material to prevent marring of a wheel;
    said cam having a generally cylindrical shape with a top surface and an opposite bottom surface;
    said top surface having an involute;
    said bottom surface having a centered pin perpendicular to said bottom surface;
    a handle, extending perpendicular to said side of said cam; and,
    whereby a wheel is placed within said stops and said cam and turning said cam temporarily secures said wheel to said frame without marring.

2. The wheel holding assembly of claim 1 further comprising:
    each of said arms having a slender shape, a top surface and an end, said top surface having a pattern of holes corresponding to wheel diameters; and,
    said ends of said arms joined together orienting said arms in a generally Y shape.

3. The wheel holding assembly of claim 1 further comprising:
    said stops having a generally cylindrical shape with a top surface and an opposite bottom surface;
    said top surface having an extension that engages said rim; and,
    said bottom surface having a centered pin perpendicular to said bottom surface and a means to fix the orientation of said stop.

4. The wheel holding assembly of claim 3 further comprising:

said extension having a location off center and four edges, a first edge located near the perimeter of said stop, a second edge perpendicular to said first edge, a third edge opposite said first edge, and a fourth edge opposite said second edge and located furthest from the perimeter of said stop, said edges having an inward bevel; and, said fixing means having four ears descending from said bottom surface and corresponding to said edges of said extension, and any two of said ears defining a notch of a width to fit said arm snugly, said notch aligning with a corresponding edge.

5. The wheel holding assembly of claim 1 further comprising:

said involute having a location off center, and an edge defined by a first radius of said involute ending approximately one half inch from the perimeter of said cam, a second radius to which said involute gradually expands around the circumference of said involute where said second radius is proximate to said first radius forming a notch, said second radius ending approximately one quarter inch from the perimeter of said cam, said edge having an inward bevel; and, said handle, having a generally cylindrical shape.

6. The wheel holding assembly of claim 5 further comprising:

said handle having a grip.

7. The wheel holding assembly of claim 3 further comprising:

said pin having a circumferential groove.

8. The wheel holding assembly of claim 1 further comprising:

said pin having a circumferential groove.

9. The wheel holding assembly of claim 3 further comprising:

said extension having a location off center and four edges, a first edge located near the perimeter of said stop, a second edge perpendicular to said first edge, a third edge opposite said first edge, and a fourth edge opposite said second edge and located furthest from the perimeter of said stop, said edges having an inward bevel; and, said fixing means having four pegs descending from said bottom surface and corresponding to said edges of said extension, and any two of said pegs defining a notch of a width to fit said arm snugly, said notch aligning with a corresponding edge.

* * * * *